(12) United States Patent
Shin et al.

(10) Patent No.: US 10,762,096 B2
(45) Date of Patent: Sep. 1, 2020

(54) METHOD FOR PROVIDING MAIL SEARCH RESULT INCLUDING AT LEAST ONE MAIL CARD, AND MAIL SERVICE SYSTEM FOR PERFORMING SAME

(71) Applicant: NAVER Corporation, Seongnam-si (KR)

(72) Inventors: Jung Sub Shin, Seongnam-si (KR); Chang Hwan Lee, Seongnam-si (KR); Eungyo Jung, Seongnam-si (KR); Jinsu Park, Seongnam-si (KR); Yeon Ah Park, Seongnam-si (KR); Myungpyo Shim, Seongnam-si (KR); Sungwoo Choo, Seongam-si (KR); Hye Ryun An, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 698 days.

(21) Appl. No.: 14/829,760

(22) Filed: Aug. 19, 2015

(65) Prior Publication Data

US 2016/0267182 A1    Sep. 15, 2016

(30) Foreign Application Priority Data

Mar. 13, 2015  (KR) .......................... 10-2015-0035288

(51) Int. Cl.
*G06F 16/248*    (2019.01)
*G06F 16/2457*   (2019.01)
(Continued)

(52) U.S. Cl.
CPC ........ *G06F 16/248* (2019.01); *G06F 16/2457* (2019.01); *G06Q 10/107* (2013.01); *H04L 51/16* (2013.01); *H04L 51/34* (2013.01)

(58) Field of Classification Search
CPC ..... H04L 51/22; G06Q 10/107; G06F 16/248; G06F 16/2457
(Continued)

(56) References Cited

U.S. PATENT DOCUMENTS 6,247,043 B1 *  6/2001  Bates .................... G06F 16/335
                                                        709/200
6,832,244 B1 * 12/2004  Raghunandan ......... H04L 51/14
                                                        709/206
(Continued)

FOREIGN PATENT DOCUMENTS

JP      2009-048338 A     3/2009
KR   10-2003-0077789     10/2003
(Continued)

OTHER PUBLICATIONS

Microsoft, "Find a message of item with Instant Search", 2007, 3 pages printed Jun. 24, 2018 from https://support.office.com/en-us/article/find-a-message-or-item-with-instant-search-69748862-5976-47b9-98e8-ed179f1b9e4d#Id0EAABAAA=Office_2007.*

(Continued)

*Primary Examiner* — Tony Mahmoudi
*Assistant Examiner* — Michael Le
(74) *Attorney, Agent, or Firm* — Greer Burns & Crain Ltd.

(57) ABSTRACT

Mail service method for searching for mail in a mail service system. At least one of a plurality of items configuring a format of mail data is set as at least one card item. A keyword is received, and for mail data that includes the keyword is searched for. A separate mail list for the at least one card item is configured by selecting mail data including the keyword in the at least one card item, and creating a mail card including a tag indicating the at least one card item and (Continued)

a link to the configured separate mail list. A search result that including the created mail card is provided.

17 Claims, 10 Drawing Sheets

(51) Int. Cl.
*H04L 12/58* (2006.01)
*G06Q 10/10* (2012.01)
(58) Field of Classification Search
USPC .......................................................... 707/706
See application file for complete search history.

(56) References Cited

U.S. PATENT DOCUMENTS

| | | | | |
|---|---|---|---|---|
| 7,209,954 | B1* | 4/2007 | Rothwell | H04L 51/12 709/206 |
| 7,720,828 | B2* | 5/2010 | Bookstaff | G06Q 10/107 707/705 |
| 7,890,603 | B2* | 2/2011 | Keohane | G06Q 10/107 707/706 |
| 7,912,904 | B2* | 3/2011 | Buchheit | G06Q 10/107 709/206 |
| 8,392,409 | B1* | 3/2013 | Kashyap | G06Q 10/107 707/723 |
| 2003/0065728 | A1* | 4/2003 | Milovanovic | G06Q 10/107 709/206 |
| 2003/0233419 | A1* | 12/2003 | Beringer | G06Q 10/107 709/206 |
| 2004/0199529 | A1* | 10/2004 | Clark | G06Q 10/107 |
| 2005/0144241 | A1* | 6/2005 | Stata | G06F 17/30067 709/206 |
| 2005/0246324 | A1* | 11/2005 | Paalasmaa | G06F 16/951 |
| 2009/0106369 | A1* | 4/2009 | Chen | G06Q 10/107 709/206 |
| 2011/0191693 | A1* | 8/2011 | Baggett | G06Q 10/107 715/752 |
| 2011/0321170 | A1* | 12/2011 | Onodera | G06F 21/552 726/26 |
| 2015/0074213 | A1* | 3/2015 | Monaco | G06Q 10/107 709/206 |
| 2015/0186494 | A1* | 7/2015 | Gilad | G06F 16/38 707/740 |
| 2016/0014151 | A1* | 1/2016 | Prakash | H04L 63/1483 726/22 |
| 2016/0188599 | A1* | 6/2016 | Maarek | H04L 51/22 707/728 |

FOREIGN PATENT DOCUMENTS

| | | |
|---|---|---|
| KR | 10-2006-0045245 | 5/2006 |
| WO | 2005/015410 A1 | 2/2005 |
| WO | 2011/001584 A1 | 1/2011 |

OTHER PUBLICATIONS

Yejaemin; [Outlook 2010] "Using Outlook—Create mail folder for particular person, Categorizing particular mails"; Feb. 11, 2012; http://blog.naver.com/PostPrint.nhn?blogId=yejaemin&logNo=100150735584.

Netkiller1; [Gmail] Learning the categorizing functions of Gmail at a sitting: Dec. 9, 2014; ; http://blog.naver.com/netkiller1/220204590674.

Korean Office Action issued in corresponding Korean Patent App. No. 10-2015-0035288, dated Mar. 21, 2016.

* cited by examiner

METHOD FOR PROVIDING MAIL SEARCH RESULT INCLUDING AT LEAST ONE MAIL CARD, AND MAIL SERVICE SYSTEM FOR PERFORMING SAME

CROSS-REFERENCE TO RELATED APPLICATION

This application claims priority from and the benefit of Korean Patent Application No. 10-2015-0035288, filed on Mar. 13, 2015, the disclosure of which is incorporated herein in its entirety by reference.

BACKGROUND

Field

Example embodiments of the present invention relate to a mail service system and method for an effective mail search.

Description of the Background

A mail service refers to a communication service that is basically configured to receive and transmit mail. In general, when conducting a search, the mail service searches for mail based on a sender or a receiver. For example, Korean Laid-Open Publication No. 10-2003-0077789 relates to an Internet e-mail management system and discloses a technology for requesting an e-mail management server to read an e-mail by inputting a keyword.

However, in a mobile environment using a mail application (App), typing with some conditions such as "sender: OOO" and "receiver: OOO" are difficult compared to a personal computer (PC) environment. In a general search using a keyword, although an input keyword is included in carbon copy (CC)/blind carbon copy (BC)/title/content as well as a sender or a receiver, all of related mail are displayed as a search result and thus, it is difficult to quickly retrieve the desired mail.

SUMMARY

Some example embodiments of the present invention provide a mail service system and method that may provide a service that enables a user to quickly retrieve the desired mail by providing a path via which the user is capable of collecting and viewing mail data that includes a keyword in a specific item, for example, a sender and a receiver, among a plurality of items configuring a format of mail data.

According to at least one example embodiment, there is provided a mail service method of a mail service system configured as a computer, the method including setting at least one of a plurality of items configuring a format of mail data, receiving a keyword as at least one card item, searching for mail data that includes the keyword, configuring a separate mail list for the at least one card item by selecting mail data that includes the keyword in the at least one card item, creating a mail card that includes a tag indicating the at least one card item and a link to the configured separate mail list, and creating and providing a search result that includes the created mail card.

The at least one card item may include at least one of a sender item and a receiver item of mail data, and the configuring of the separate mail list may include configuring the separate mail list by selecting mail data that includes a name corresponding to the keyword in at least one of the sender item and the receiver item.

Configuring of the separate mail list may include creating a different mail list for each mail address when two or more mail addresses correspond to the name, and creating of the mail card may include creating different mail cards with respect to different mail lists. The different mail cards may be identified based on the mail addresses.

The at least one card item may include at least one of a sender item and a receiver item of mail data, and the configuring of the separate mail list may include configuring the separate mail list by selecting mail data that includes a mail address corresponding to the keyword in at least one of the sender item and the receiver item, and by sorting the mail data based on the time at which the mail data is transmitted or a date on which the mail data is received.

The at least one card item may include an attachment file item of mail data, and configuring of the separate mail list may include configuring the separate mail list by selecting mail data that includes a file name corresponding to the keyword or a hash value of the file name in the attachment file item.

Creating and providing of the search result may include creating the search result to further include information about the remaining mail data excluding the selected mail data from the retrieved mail data, and creating the search result to include the mail card at an upper end of the search result.

The search result may be provided to a user terminal having transmitted the keyword and displayed on the display of the user terminal. In response to selecting the mail card from the search result displayed on the display of the user terminal, the separate mail list may be provided to the user terminal through the link included in the mail card.

Setting of the at least one card item may include providing information about the plurality of items to a user terminal, and setting, as the at least one card item, at least one item selected by the user terminal from among the plurality of items.

According to at least one example embodiment, there is provided a mail service system configured as a computer, including a card item setter configured to set at least one of a plurality of items configuring a format of mail data as at least one card item, a keyword receiver configured to receive a keyword, a mail data searcher configured to search for mail data that includes the keyword, a mail list configurer configured to configure a separate mail list by selecting mail data that includes the keyword in the at least one card item, a mail card creator configured to create a mail card that includes a tag indicating the at least one card item and a link to the configured separate mail list, and a search result provider configured to create and provide a search result that includes the created mail card.

The at least one card item may include at least one of a sender item and a receiver item of mail data, and the mail list configurer may be configured to configure the separate mail list by selecting mail data that includes a name corresponding to the keyword in at least one of the sender item and the receiver item.

The at least one card item may include at least one of a sender item and a receiver item of mail data, and the mail list configurer may be configured to configure the separate mail list by selecting mail data that includes a mail address corresponding to the keyword in at least one of the sender item and the receiver item, and by sorting the mail list based on the time at which the mail data is transmitted or a date on which the mail data is received.

The card item may include an attachment file item of mail data, and the mail list configurer may be configured to configure the separate mail list by selecting mail data that includes a file name corresponding to the keyword or a hash value of the file name in the attachment file item.

The search result provider may be configured to create the search result to further include information about the remaining mail data excluding the selected mail data from the retrieved mail data, and to create the search result to include the mail card at an upper end of the search result.

The search result may be provided to a user terminal having transmitted the keyword and displayed on the display of the user terminal, and the search result provider may be configured to, in response to selecting the mail card from the search result displayed on the display of the user terminal, provide the separate mail list to the user terminal through a link included in the mail card.

The card item setter may be configured to provide information about the plurality of items to a user terminal, and may set, as the at least one card item, at least one item selected by the user terminal from among the plurality of items.

It is to be understood that both the foregoing general description and the following detailed description are explanatory and are intended to provide further explanation of the example embodiments as claimed.

According to at least one example embodiment of the present invention, there is provided a mail service system and method that provided a service that enables a user to quickly retrieve the desired mail by providing a path via which the user is capable of collecting and viewing mail data that includes a keyword in a specific item, for example, a sender and a receiver, among a plurality of items configuring a format of mail data.

BRIEF DESCRIPTION OF THE DRAWINGS

The foregoing and other features of the example embodiments of the present invention will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
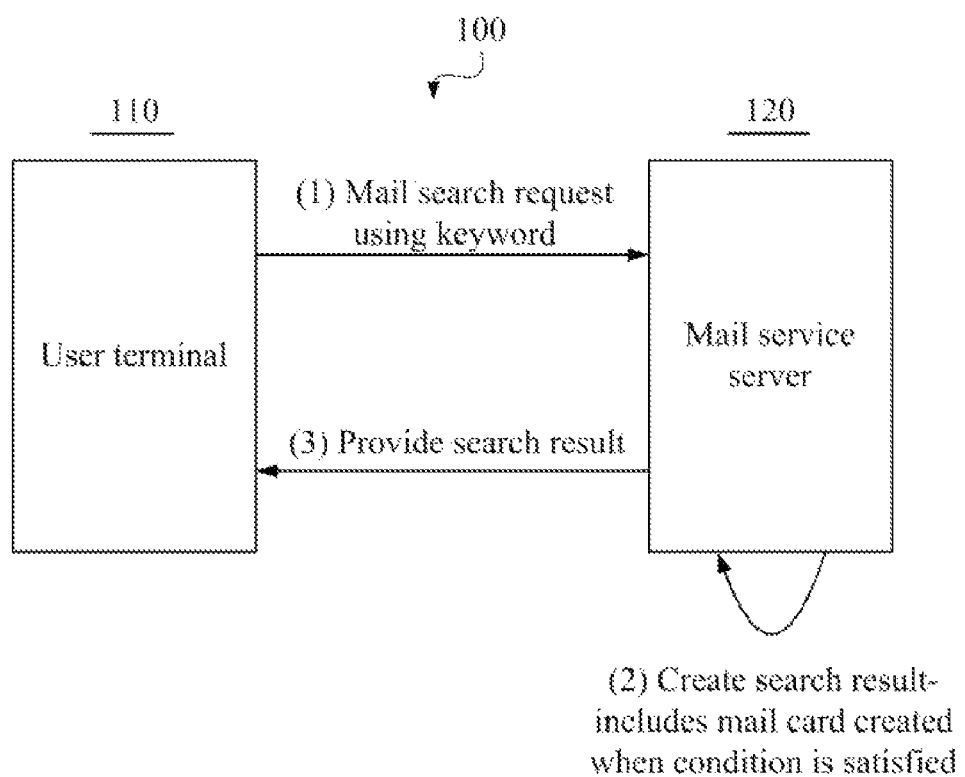
FIG. 1 is a diagram illustrating an operation environment of a mail service system according to one example embodiment.

Example embodiments of the present invention will now be described more fully with reference to the accompanying drawings. Example embodiments, may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

"includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the At least one example embodiment relates to a mail service system and a mail service method that provide a service so that a user may quickly connect to the desired e-mail among e-mails of the user stored and managed in association with the user. As often employed in the art, the term "mail" is used herein for "e-mail," and "mails" for "e-mail messages" or "e-mails".

FIG. 1 is a diagram illustrating an example of an operation environment of a mail service system 100 according to one example embodiment. The mail service system 100 includes a user terminal 110 and a mail service server 120.

The user terminal 110 may be a device, such as a smartphone of a user, that utilizes a mail service by connecting to the mail service server 120 over a network. For example, an application (hereinafter, a "mail App") associated with the mail service server 120 may be installed in the user terminal 110. In this example, the user terminal 110 may utilize the mail service by connecting to the mail service server 120 according to a control of the mail App.

The mail service server 120 may be a server device that provides the mail service to the user terminal 110 or a plurality of service devices mutually connected. The mail service server 120 may be a management server or a database that stores and manages mail data associated with the user, a server that includes the management server or the database, or a server connected to the management server or the database.

The user terminal 110 and the mail service server 120 may operate as in the following examples operations (1) through (3).

(1) The user terminal 110 may request the mail service server 120 for a mail search using a keyword. For example, the keyword may be text information input from the user of the user terminal 110 through an input interface of the user terminal 110. The input interface may be provided to the user through the user terminal 110 according to a control of the mail App. The user terminal 110 may request a mail search by transmitting, to the mail service server 120, a keyword input from the user through the input interface.

(2) The mail service server 120 may create a search result. In this example, the search result may include a mail card created when a condition is satisfied. The mail card may be used to help the user quickly connect to the desired mail. A method of creating and using the mail card will be further described below.

(3) The mail service server 120 may provide a search result to the user terminal 110. The search result may include information about mail data retrieved using the keyword, and may also include the mail card. The search result may be displayed on a display of the user terminal 110 and thereby provided to the user.

Figure 2:
FIG. 2 illustrates a plurality of items configuring a format of mail data according to one example embodiment.

FIG. 2 illustrates an example of a plurality of items configuring a format of mail data according to an example embodiment of the present invention. FIG. 2 illustrates a screen 200 for creating a mail. Referring to the screen 200, a format of mail data may generally include a plurality of items, for example, a sender, a receiver, a carbon copy (CC), a blind carbon copy (BC), a title, content, and an attachment file. Orders, names, arrangements, and/or the like configuring the plurality of items may vary based on the mail service.

In this example, the mail service server 120 may set, as a card item, at least one of the plurality of items configuring the format of mail data. For example, the mail service server 120 may set at least one item as a card item using a variety of methods based on necessity, such as setting each of a sender item and a receiver item as the card item, or setting each of the sender item and an attachment file item, as a card item. Further, the card item may be optionally set by the user.

Figure 3:
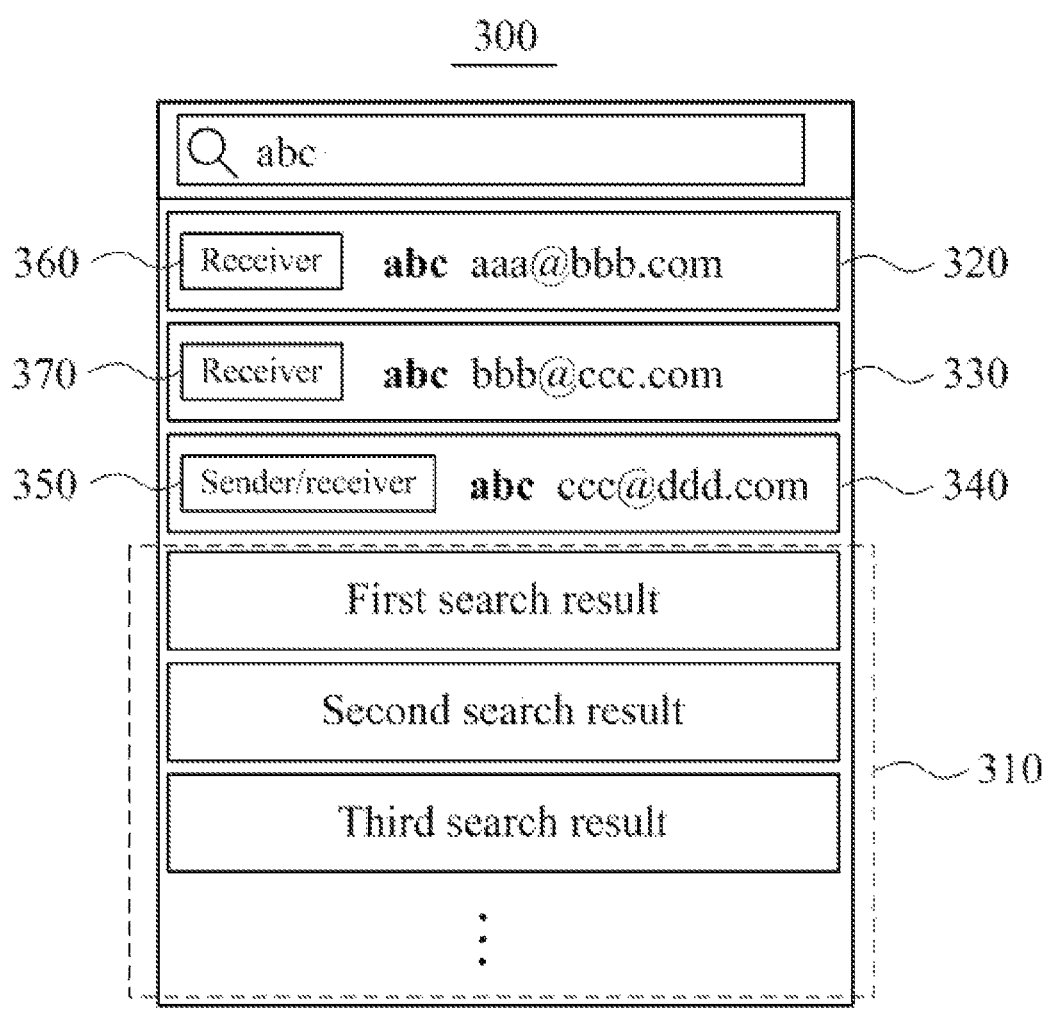
FIG. 3 illustrates an example of providing a search result in response to an input of a keyword according to one embodiment.

FIG. 3 illustrates an example of providing a search result in response to an input of a keyword according to one embodiment. FIG. 3 illustrates a screen 300 on which a search result about a keyword 'abc' is displayed. Referring to FIG. 3, mail cards 320, 330, and 340 in addition to a plurality of search results included in a box 310 indicated with dotted lines are displayed on the screen 300. A 'mail card' may be summary information about mail data that includes a keyword in description of a card item, and may include a link to a list of mail data. In this example, in a state in which a sender item and a receiver item are preset as card items, the mail cards 320, 330, and 340 may be summary information about a list of mail data that includes the input keyword 'abc' in the sender item or the receiver item as a name. Here, referring to the screen 300, different mail cards may be created based on a mail address with respect to the same name "abc". When a different mail card is created based on a mail address, the mail service system 100 may classify and thereby display mails of different users with the same name for each mail card regardless of a user conducting a convenient search only with a name and thus, the user may easily connect to desired mail data.

The plurality of search results included in the box 310 may be information about mail data that includes the keyword 'abc' in the remaining items not set as a mail card. When each of the items is all set as a mail card, the search result may be configured using only mail cards.

To this end, the mail service server 120 may receive a keyword. In the example of FIG. 3, the keyword "abc" input through the input interface of the user terminal 110 is transmitted to the mail service server 120 over a network. The mail service server 120 receives the keyword "abc". Here, the mail service server 120 may configure a separate mail list for each card item by selecting mail data that includes the keyword in the set card item.

Further, the mail service server 120 may create a mail card that at least includes a tag indicating a card item and a link to the configured mail list, and may create and provide the search result that includes the mail card. The screen 300 is an example of displaying the search result on the display of the user terminal 110. In this example, the mail card 340 may be created by including "sender/receiver" 350 as the tag indicating the set card item. Also, the mail card 340 may include a link to the configured separate mail list, for example, a list of mail data that includes the keyword "abc" as a name and has a mail address "ccc@ddd.com". Including only receiver 360 and receiver 370 as tags indicate the absence of mail data that includes the name "abc" and mail addresses "aaa@bbb.com" and "bbb@ccc.com" in a sender item.

Figure 4:
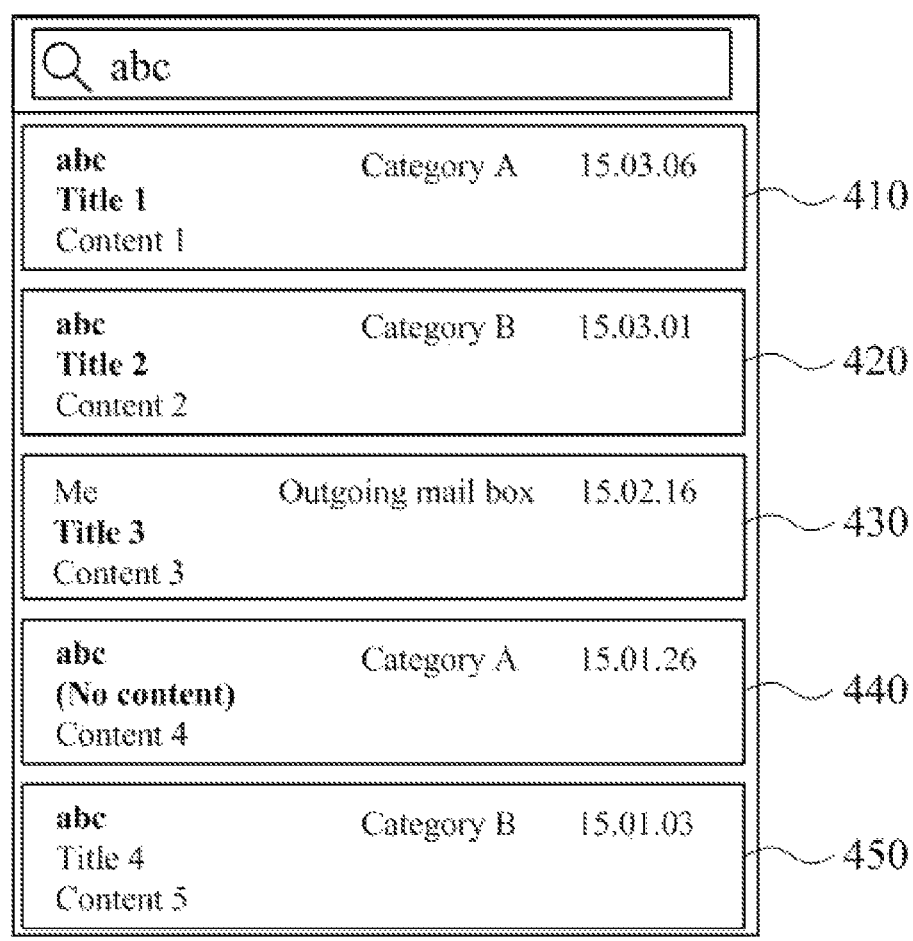
FIG. 4 illustrates an example of providing a list of mail data according to one embodiment.

FIG. 4 illustrates an example of providing a list of mail data according to one example embodiment. A screen 400 represents an example of a mail list of mail data provided when the mail card 340 is selected by the user on the screen 300 of FIG. 3, for example, when the user selects the mail card 340 by tabbing an area of the mail card 340 displayed on a touch screen of a mobile environment with a finger.

Among a total of five pieces of mail data 410, 420, 430, 440, and 450 displayed on the screen 400, four pieces of the mail data 410, 420, 440, and 450 may represent a case in which a name "abc" is included in a sender item, and a single piece of the mail data 430 may represent a case in which the name "abc" is included in a receiver item. That is, in the example of the screen 400, the mail card 340 indicates a case in which a card item includes all of the sender item and the receiver item.

If the card item includes only the receiver item in another example, only mail data that includes the name "abc" in the receiver item may be configured as a mail list.

Figure 5:
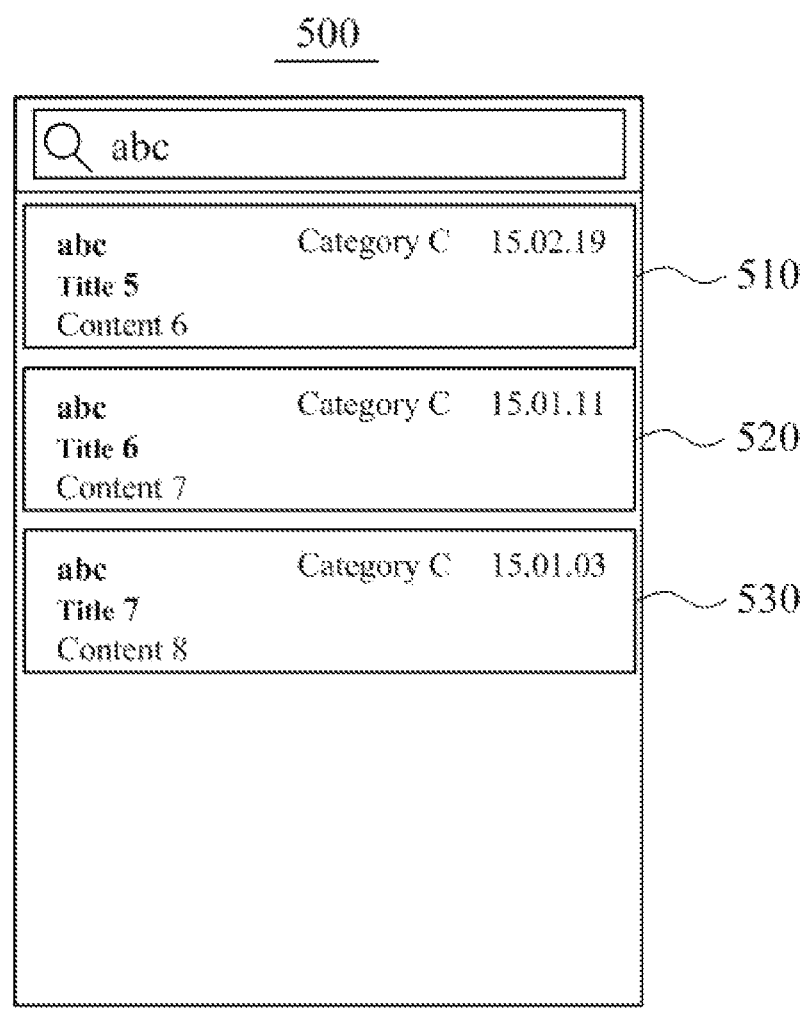
FIG. 5 illustrates another example of providing a list of mail data according to one embodiment.

FIG. 5 illustrates another example of providing a list of mail data according to an example embodiment. A screen 500 represents an example of a mail list of mail data provided when the mail card 330 is selected by the user on the screen 300 of FIG. 3. The mail card 330 relates to mail data 510, 520, and 530 in which a card item includes only a receiver item, a name is "abc", and a mail address is "bbb@ccc.com". The screen 500 shows a list of the mail data 510, 520, and 530.

Referring to FIGS. 4 and 5, "category A", "category B", an "outgoing mail box", and "category C" indicate category names used to manage corresponding mail data. For example, "category A" may be one of classifications of an incoming mail box.

Figure 6:
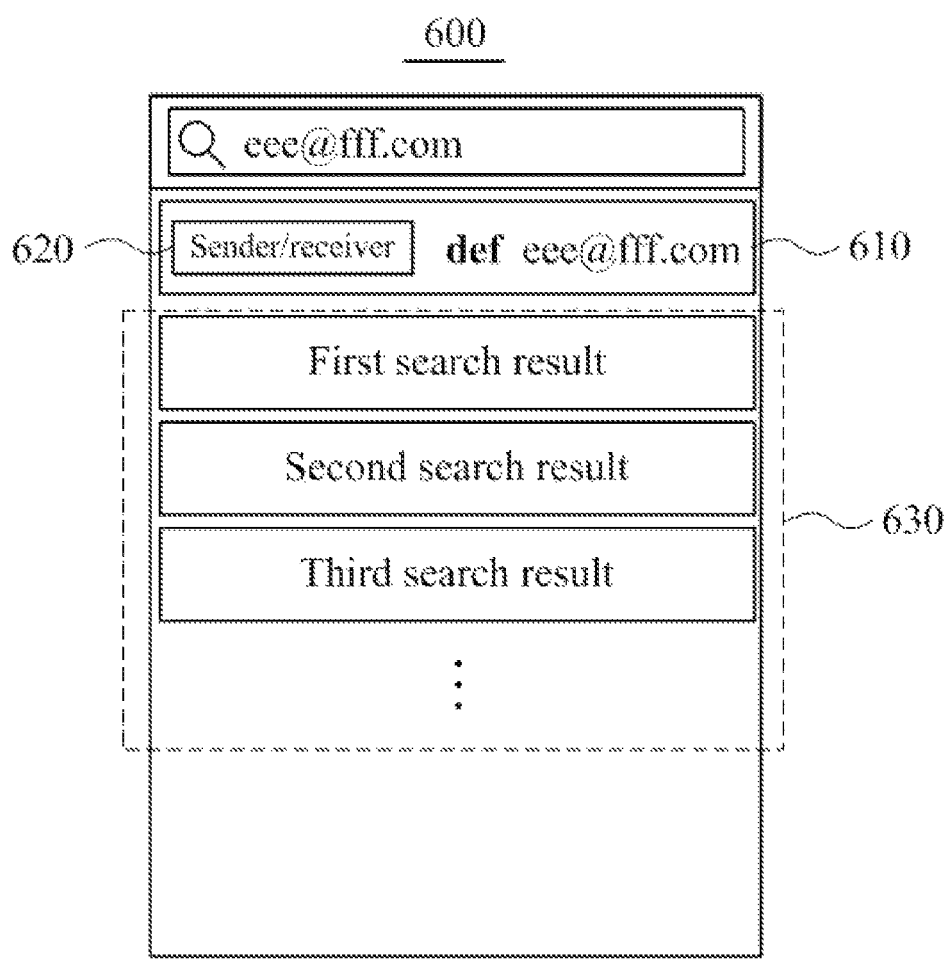
FIG. 6 illustrates another example of providing a search result in response to an input of a keyword according to one embodiment.

FIG. 6 illustrates another example of providing a search result in response to an input of a keyword according to an example embodiment. A screen 600 of FIG. 6 shows an example of a mail card 610 created as summary information about mail data that includes a mail address "eee@fff.com" in a receiver item or a sender item when the mail address "eee@fff.com" is input as a keyword. That the mail card 610 includes "sender/receiver" 620 as a tag indicates that a card item corresponding to the mail card 610 includes all of the sender item and the receiver item, and that mail data including the mail address "eee@fff.com" in the sender item and mail data including the mail address "eee@fff.com" in the receiver item are all present.

Search results included in a box 630 indicated with dotted lines may be information about mail data including the mail address "eee@fff.com" in remaining items, for example, a CC item, a BC item, a title item, a content item, and an attachment file item, excluding the sender item and the receiver item.

Figure 7:
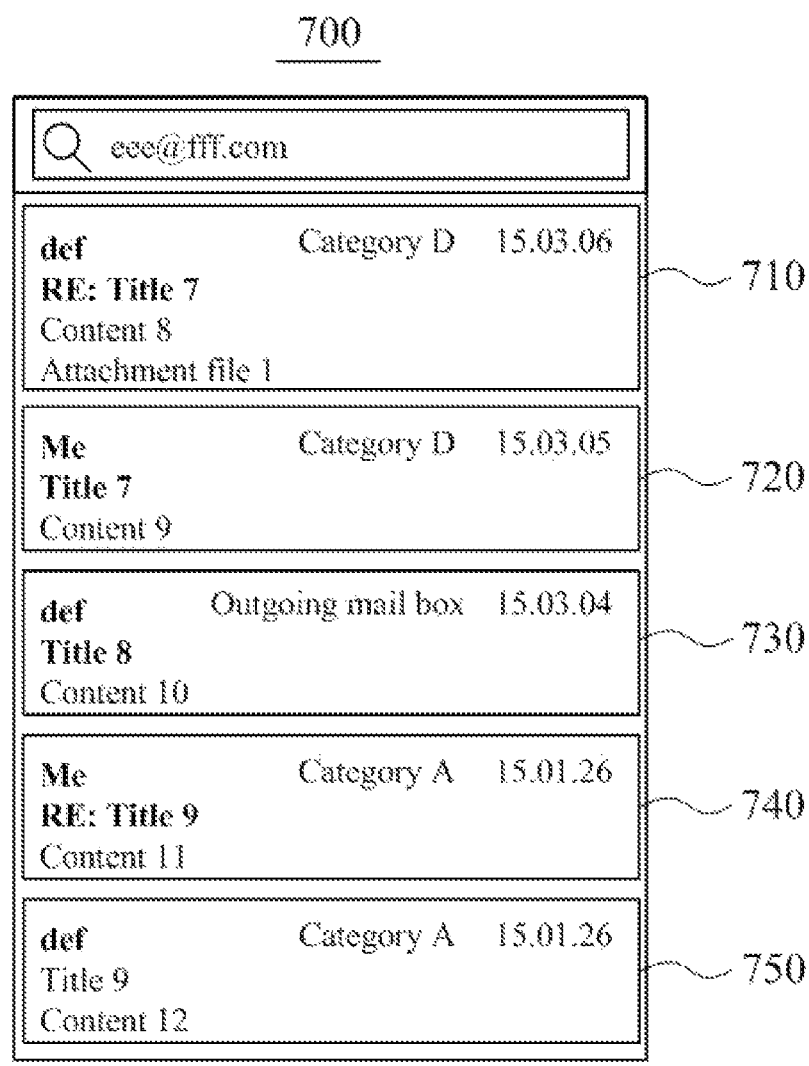
FIG. 7 illustrates still another example of providing a list of mail data according to one embodiment.

FIG. 7 illustrates still another example of providing a list of mail data according to an example embodiment of the present invention. A screen 700 of FIG. 7 shows an a mail list of mail data 710, 730, and 750 that includes a mail address "eee@fff.com" in a sender item and mail data 720 and 740 that includes the mail address "eee@fff.com" in a receiver item in response to the mail card 610 of FIG. 6 selected by the user.

According to the embodiments of the present invention, it is possible to provide a search result so that a user may verify the context of mails (i.e., e-mails) exchanged with a specific user at a glance from a single list, without a need to search each of an outgoing mail box and an incoming mail box for a mail exchanged with the specific user, and without the need to find the required mail data from a search result retrieved for each item.

Figure 8:
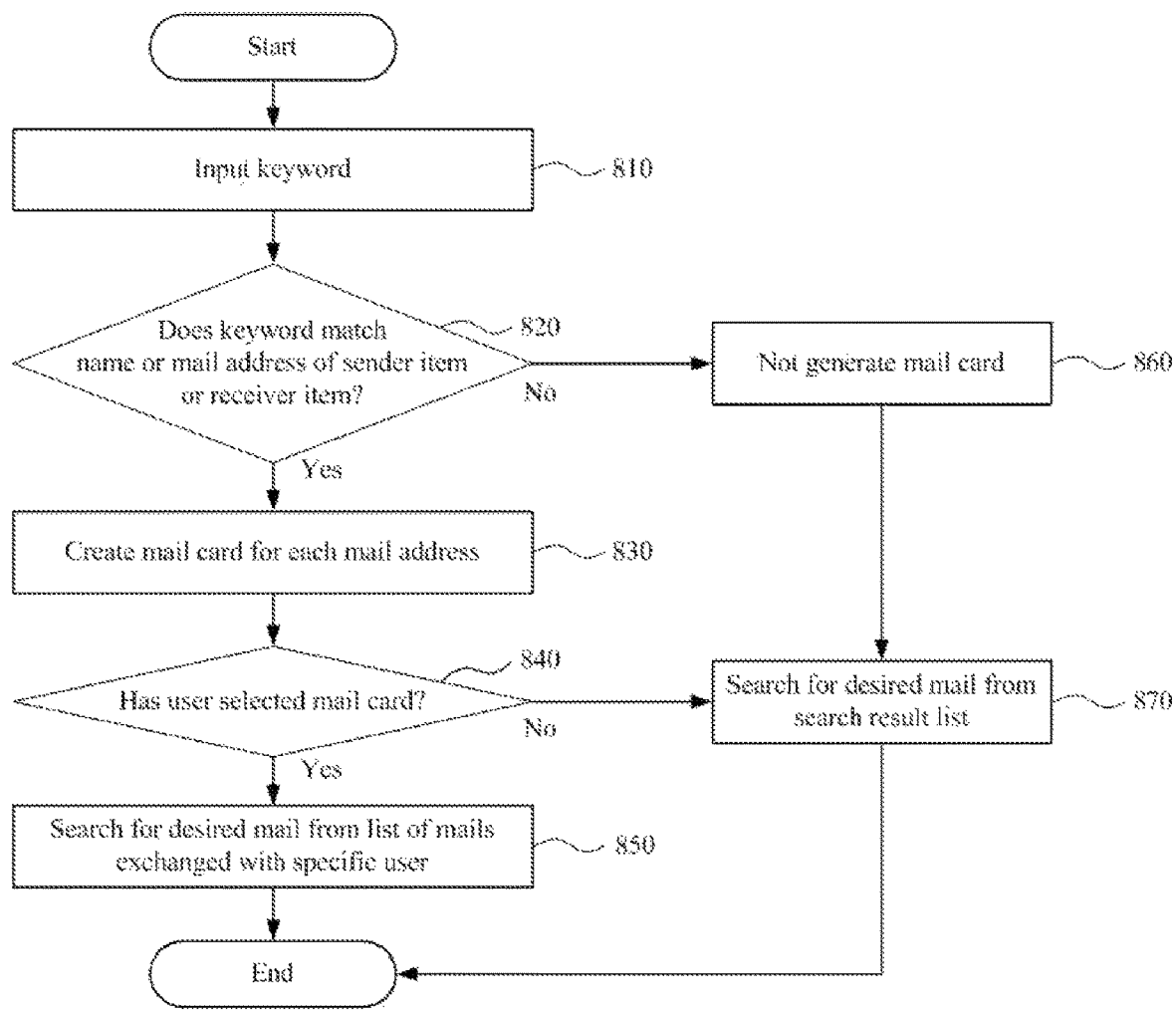
FIG. 8 is a flowchart illustrating a process of searching for a mail exchanged with a specific user according to one example embodiment.

FIG. 8 is a flowchart illustrating an example of a process of searching for a mail exchanged with a specific user according to one example embodiment. FIG. 8 shows an example of a process of searching for a mail desired by a user. This process may be initiated in response to the user executing a mail App on the user terminal 110. Here, it is assumed that a card item is set to include a sender item and a receiver item.

In operation 810, a user inputs a keyword. As described above, the user terminal 110 provides an input interface according to the control of the mail App. Information input through the input interface may be used as a keyword.

In operation 820, the mail service system 100 determines whether the keyword matches a name or a mail address of a sender item or a receiver item. When the keyword matches the name or the mail address, the mail service system 100 performs operation 830 and otherwise, performs operation 860.

In operation 830, the mail service system 100 creates a mail card for each mail address. The created mail card is included in a search result and thereby provided to the user through the user terminal 110. Conversely, when the keyword does not match the name or the mail address of the sender item or the receiver item, the mail card is not created in operation 860, and a general search result is provided to the user through the user terminal 110. In this example, the user may search for a desired mail from a search result list in operation 870.

In operation 840, the mail service system 100 determines whether the user has selected the mail card. When the user does not select the mail card, the user may search for a desired mail from the search result list in operation 870.

Conversely, when the user selects the mail card, a mail list of mail data corresponding to the mail card is provided to the user and the user may search for a desired mail from a list of mails exchanged with a specific user, for example, a person corresponding to the name or the mail address of the keyword in operation 850. The mail list includes only mails exchanged with the specific user and thus, the user may easily find the desired mail.

Figure 9:
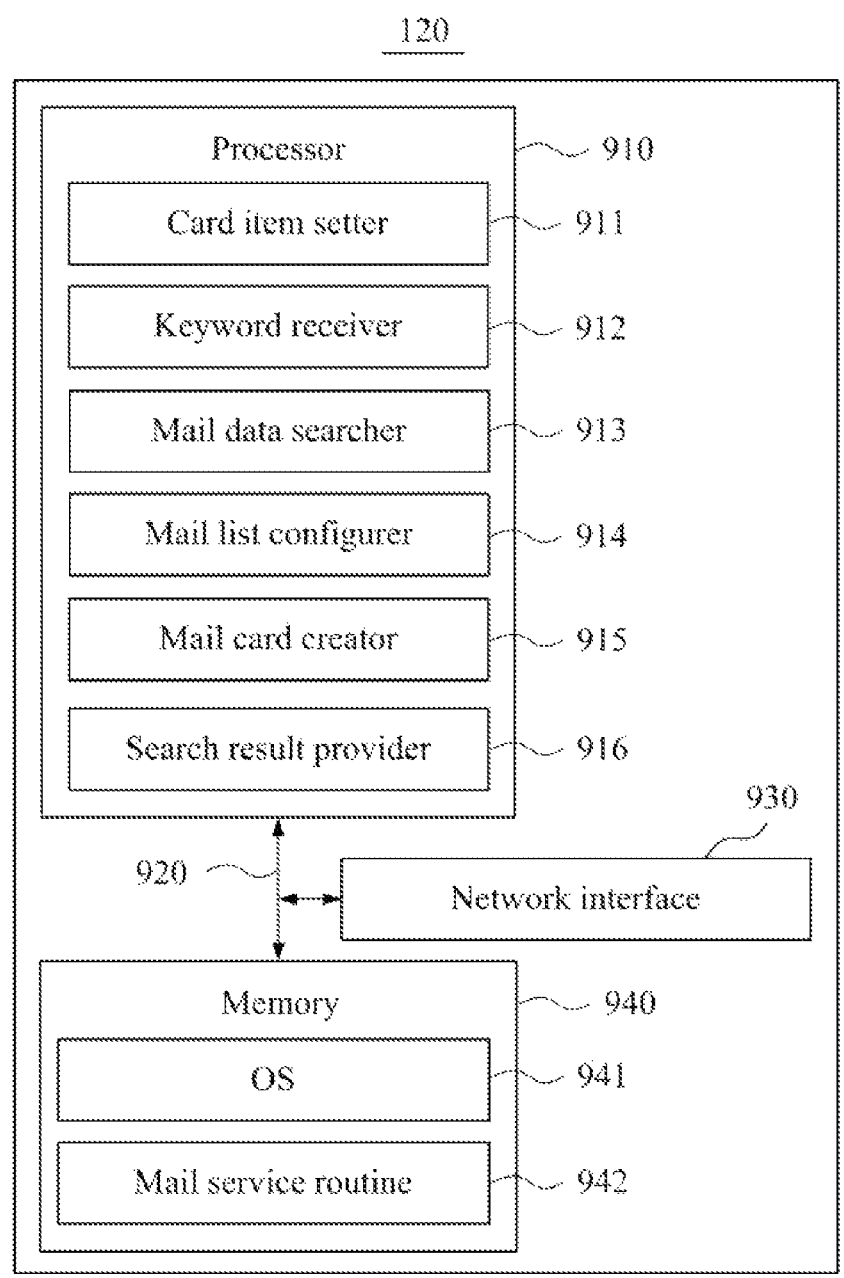
FIG. 9 is a block diagram illustrating a configuration of a mail service system according to one example embodiment.
Figure 10:
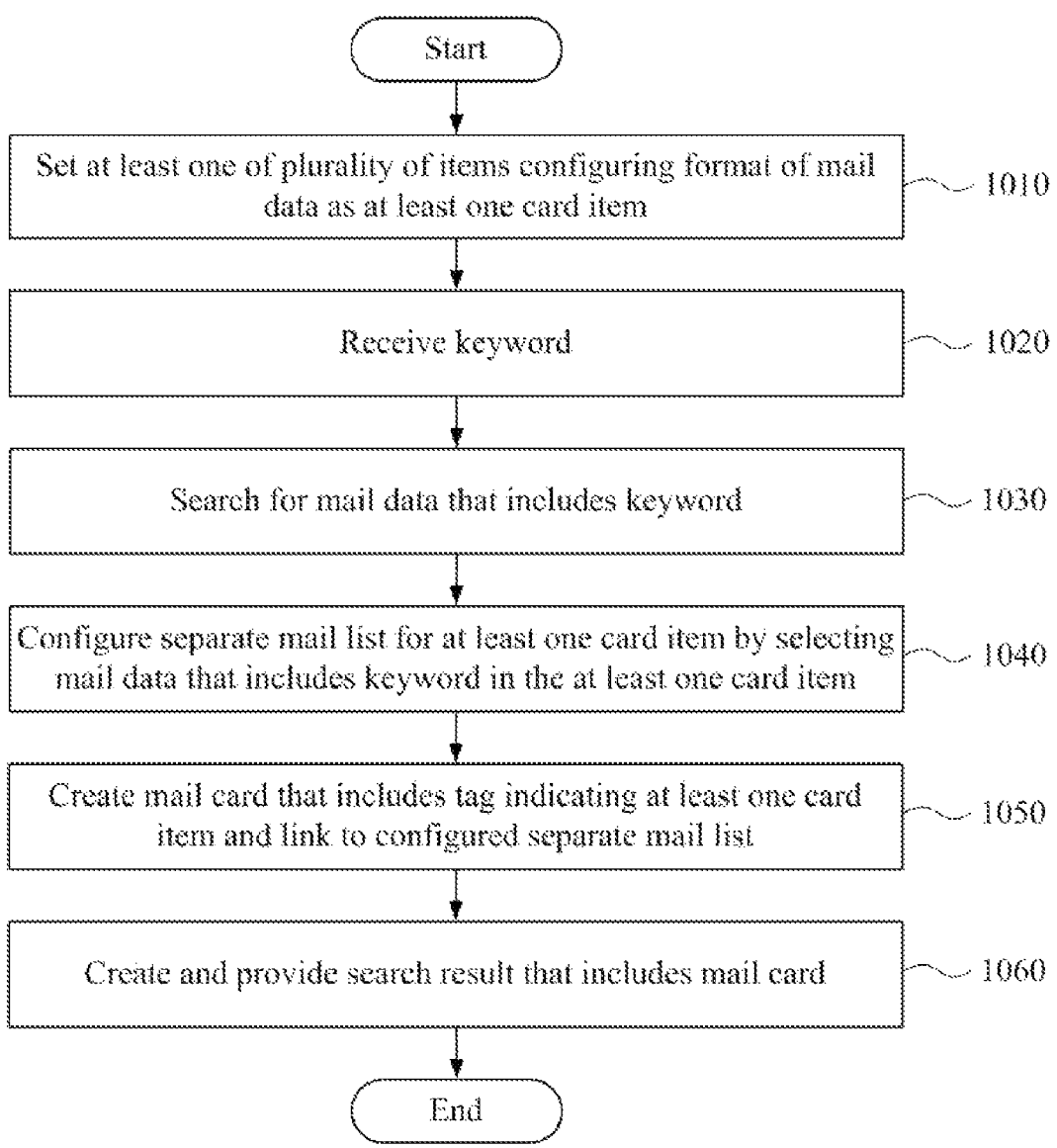
FIG. 10 is a flowchart illustrating a mail service method according to one example embodiment.

FIG. 9 is a block diagram illustrating a configuration of the mail service server 120 according to one example embodiment, and FIG. 10 is a flowchart illustrating the mail service method according to an example embodiment. Referring to FIG. 9, the mail service server 120 includes a processor 910, a bus 920, a network interface 930, and a memory 940. The memory 940 includes an operating system (OS) 941 and a mail service routine 942. The processor 910 includes a card item setter 911, a keyword receiver 912, a mail data searcher 913, a mail list configurer 914, a mail card creator 915, and a search result provider 916, which are functional operations performed by the processor. According to other example embodiments, the mail service server 120 includes more constituent elements than the number of constituent elements of FIG. 9. However, there is no need to clearly illustrate many constituent elements according to the related art. For example, the mail service server 120 may further include other constituent elements such as a display or a transceiver.

The memory 940 may include a permanent mass storage device, such as a random access memory (RAM), a real only memory (ROM), and a disc drive, as a computer-readable storage medium. Also, program codes for the OS 941 and the mail service routine 942, and the like, may be stored in the memory 940. Such software constituent elements may be loaded from another computer-readable storage medium separate from the memory 940 using a drive mechanism (not shown). The other computer-readable storage medium may include, for example, a floppy drive, a disc, a tape, a DVD/CD-ROM drive, and a memory card. Software constituent elements may be loaded to the memory 940 through the network interface 930 instead of using the computer-readable storage medium. For example, the mail service routine 942 may be loaded to the memory 940 based on a program installed by files provided from developers over a network.

The bus 920 enables communication and data transmission between the constituent elements of the mail service server 120. The bus 920 may be configured using a high-speed serial bus, a parallel bus, a storage area network (SAN), and/or another appropriate communication technology.

The network interface 930 may be a computer hardware constituent element for connecting the mail service server 120 to the computer network. The network interface 930 may connect the mail service server 120 to the computer network through a wireless or wired connection.

The processor 910 is configured to process computer-readable instructions of a computer program by performing a basic calculation, a logic, and an input/output operation of the mail service server 120. The computer-readable instructions may be provided from the memory 940 or the network interface 930 to the processor 910 through the bus 920. The processor 910 is also configured to execute program codes for the card item setter 911, the keyword receiver 912, the mail data searcher 913, the mail list configurer 914, the mail card creator 915, and the search result provider 916. The program codes may be stored in a storage device such as the memory 940.

Here, the card item setter 911, the keyword receiver 912, the mail data searcher 913, the mail list configurer 914, the mail card creator 915, and the search result provider 916 are configured to perform operations 1010 through 1060 of FIG. 10.

In operation 1010, the card item setter 911 sets at least one of a plurality of items configuring a format of mail data as at least one card item. As described above, the plurality of items configuring the format of mail data may include, for example, a sender item, a receiver item, a title item, a content item such as a mail content item, an attachment file item, a CC item, and a BC item. One item may correspond to one card item. The card item setter 911 may set at least one card item configured by including at least one of the various items. The card item may be optionally set by the user. For example, the card item setter 911 may provide information about a plurality of items to a user terminal 110 and may set, as a card item, an item selected by the user terminal 110 from the plurality of items. For example, the setting of the card item may be performed using an environment setting function of a mail App installed in the user terminal 110, or may be performed using a separate detailed setting function provided together with a search window.

In operation 1020, the keyword receiver 912 receives a keyword. The keyword input to the user terminal 110 may be transmitted from the user terminal 110 to the mail service server 120 according to the control of the mail App.

In operation 1030, the mail data searcher 913 searches for mail data that includes the keyword. For example, the mail data searcher 913 may search a database configured to manage mail data for mail data including the keyword.

In operation 1040, the mail list configurer 914 configures a separate mail list for the at least one card item by selecting mail data that includes the keyword in the at least one card item. For example, the card item may include at least one of a sender item and a receiver item of mail data. In this example, the mail list configurer 914 may configure the separate mail list by selecting mail data that includes a name corresponding to the keyword in at least one of the sender item and the receiver item. When two or more mail addresses correspond to the name, the mail list configurer 914 may create a different mail list for each mail address.

As another example, the mail list configurer 914 may configure the separate mail list by selecting mail data that includes a mail address corresponding to the keyword in at least one of the sender item and the receiver item. In this example, the mail list configurer 914 may configure the separate mail list by sorting the mail data based on a time at which the mail data is transmitted or a date on which the mail data is received.

As still another example, the card item may include an attachment file item of mail data. In this example, the mail list configurer 914 may configure the separate mail list by selecting mail data that includes a file name corresponding to the keyword of a hash value of the file name in the attachment file item.

As described above, the card item may be configured using a single item or a combination of two or more items. Although not described in the above example embodiments, the card item may also be configured using a combination of various items such as a combination of the sender item and the attachment file item or a combination of the receiver item and a mail content item. In an example in which a card item including the sender item and the attachment file item is set, when a keyword in a format of "name+file name" is input, mail data that includes the name in the sender item and includes the file name as an attachment file may be configured as a separate mail list.

In operation 1050, the mail card creator 915 creates a mail card that at least includes a tag indicating the at least one card item and a link to the configured separate mail list. The mail card may be created for each mail item or each mail list. For example, when mail data having different mail addresses with respect to a single name configures different mail lists for the respective mail addresses, different mail cards may be created with respect to the different mail lists.

In operation 1060, the search result provider 916 creates and provide a search result that includes the mail card. For example, the search result provider 916 may create the search result to further include information about the remaining mail data excluding the selected mail data from the retrieved mail data. In this instance, the search result provider 916 may create the search result to include the mail card at the top end of the search result. That is, the search result may be created and provided so that the mail card may have a relatively high display priority.

The search result may be provided to the user terminal 110 having transmitted the keyword and be displayed on a display of the user terminal. When the mail card is selected from the search result displayed on the terminal of the user terminal 110, the separate mail list may be provided to the user terminal through the link included in the mail card. Accordingly, the user may quickly search for a desired mail through the mail list.

As described above, according to some example embodiments, it is possible to provide a service that enables a user to quickly retrieve a desired mail by providing a path via which the user is capable of collecting and viewing mail data that includes a keyword in a specific item, for example, a sender and a receiver, among a plurality of items configuring a format of mail data.

The units and/or modules of the mail service system 100 of the present invention described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A mail service method for searching for mail in a mail service system configured as a computer that is connectable to a user terminal over a network, the method comprising:
   setting at least one of a plurality of items configuring a format of mail data as at least one card item, wherein the plurality of items comprise a sender item, a receiver item of mail data, and an attachment file item of mail data, the card item being associated with a tag indicating the card item, wherein the tag includes a unique identifier;
   receiving a keyword from the user terminal in communication with the mail service system over the network, the keyword being different from the tag indicating the card item;
   in response to receiving the keyword, searching for and retrieving mail data that includes the keyword;
   configuring a separate mail list for the at least one card item by selecting a subset of mail data among the retrieved mail data that is determined as a result of said searching to include the keyword in the at least one card item, wherein the subset of mail data includes a plurality of pieces of mail data such that the configured separate mail list includes the plurality of pieces of mail data;
   creating a mail card that includes the tag indicating the at least one card item, an interactive link to the configured separate mail list, and summary information on mail data among the selected subset of mail data that includes the keyword in a description of the at least one card item; and
   creating a search result that includes the created mail card, and providing the created search result to the user terminal over the network in response to receiving the keyword, wherein the search result, including at least the mail card with the included tag, is displayed on a display of the user terminal;
   wherein the creating and the providing of the search result comprises creating the search result to further include information about a portion of the retrieved mail data that does not include the selected subset of mail data, and creating and providing the search result to include and display the mail card and display the included tag within the mail card at a top end of the displayed search results.

2. The method of claim 1, wherein the at least one card item includes at least one of a sender item and a receiver item of mail data, and
   the configuring of the separate mail list comprises configuring the separate mail list by selecting the subset of mail data among the retrieved mail data that is determined as a result of said searching to include a name corresponding to the keyword in at least one of the sender item and the receiver item.

3. The method of claim 2, wherein the configuring of the separate mail list further comprises creating a different mail list for each mail address when two or more mail addresses correspond to the name corresponding to the keyword, the creating of the mail card comprises creating different mail cards with respect to different mail lists, and the different mail cards are identified based on the mail addresses.

4. The method of claim 1, wherein the at least one card item includes at least one of a sender item and a receiver item of mail data, and the configuring of the separate mail list comprises configuring the separate mail list by selecting the subset of mail data among the retrieved mail data that is determined as a result of said searching to include a mail address corresponding to the keyword in at least one of the sender item and the receiver item, and by sorting the mail data based on a time at which the mail data is transmitted or a date on which the mail data is received.

5. The method of claim 1, wherein the at least one card item includes an attachment file item of mail data, and the configuring of the separate mail list comprises configuring the separate mail list by selecting the subset of mail data among the retrieved mail data that is determined as a result of said searching to include a hash value of the file name in the attachment file item.

6. The method of claim 1, wherein in response to selecting the mail card from the search result displayed on the display of the user terminal, the separate mail list including the plurality of pieces of mail data is provided to the user terminal through the interactive link included in the mail card.

7. The method of claim 1, wherein the setting of the at least one card item comprises providing information about the plurality of items to the user terminal, and setting, as the at least one card item, at least one item selected by the user terminal from among the plurality of items.

8. The mail service method of claim 1, wherein the unique identifier comprises a string.

9. The mail service method of claim 1, wherein the unique identifier comprises a word.

10. The mail service method of claim 1, wherein the unique identifier comprises a name.

11. A non-transitory computer-readable medium storing a program to implement a method on a mail service system configured as a computer that is connected to a user terminal over a network, the method comprising:

setting at least one of a plurality of items configuring a format of mail data as at least one card item, wherein the plurality of items comprise a sender item, a receiver item of mail data, and an attachment file item of mail data, the card item being associated with a tag indicating the card item, wherein the tag includes a unique identifier;

receiving a keyword from the user terminal in communication with the mail service system over the network, the keyword being different from the tag indicating the card item;

in response to receiving the keyword, searching for and retrieving mail data that includes the keyword;

configuring a separate mail list for at least one card item by selecting a subset of mail data among the retrieved mail data that is determined as a result of said searching to include the keyword in the at least one card item, wherein the subset of mail data includes a plurality of pieces of mail data such that the configured separate mail list includes the plurality of pieces of mail data;

creating a mail card that includes the tag indicating the at least one card item, an interactive link to the configured separate mail list, and summary information on mail data among the selected subset of mail data that includes the keyword in a description of the at least one card item; and creating a search result that includes the created mail card, and providing the created search result to the user terminal over the network in response to receiving the keyword, wherein the search result, including at least the mail card with the included tag, is displayed on a display of the user terminal;

wherein the creating and the providing of the search result comprises creating the search result to further include information about a portion of the retrieved mail data that does not include the selected subset of mail data, and creating and providing the search result to include and display the mail card and display the included tag within the mail card at a top end of the displayed search result.

12. A mail service system for searching for mail that is connectable to a user terminal over a network, comprising:

a hardware processor configured to perform functions of programs including, a card item setter configured to set at least one of a plurality of items configuring a format of mail data as at least one card item, wherein the plurality of items comprise a sender item, a receiver item of mail data, and an attachment file item of mail data, the card item being associated with a tag indicating the card item, wherein the tag includes a unique identifier;

a keyword receiver configured to receive a keyword from the user terminal in communication with the processor over the network, the keyword being different from the tag indicating the card item;

a mail data searcher configured to search for mail data that includes the keyword in response to receiving the keyword;

a mail list configurer configured to configure a separate mail list by selecting a subset of mail data among the retrieved mail data that is determined as a result of said searching to include the keyword in the at least one card item, wherein the subset of mail data includes a plurality of pieces of mail data such that the configured separate mail list includes the plurality of pieces of mail data;

a mail card creator configured to create a mail card that includes the tag indicating the at least one card item, an interactive link to the configured separate mail list, and summary information on mail data among the selected subset of mail data that includes the keyword in a description of the at least one card item; and a search result provider configured to create a search result that includes the created mail card and provide the created search result to the user terminal over the network in response to receiving the keyword, wherein the search result, including at least the mail card with the included tag, is displayed on a display of the user terminal;

wherein the search result provider is configured to create the search result to further include information about a portion of the retrieved mail data that does not include the selected subset of mail data, and to create and provide the search result to include and display the mail card and display the included tag within the mail card at the top end of the displayed search result.

13. The mail service system of claim 12, wherein the at least one card item includes at least one of a sender item and a receiver item of mail data, and
the mail list configurer is configured to configure the separate mail list by selecting mail data among the retrieved mail data that is determined as a result of said searching to include a name corresponding to the keyword in at least one of the sender item and the receiver item.

14. The mail service system of claim 12, wherein the at least one card item includes at least one of a sender item and a receiver item of mail data, and
the mail list configurer is configured to configure the separate mail list by selecting mail data among the retrieved mail data that is determined as a result of said searching to include a mail address corresponding to the keyword in at least one of the sender item and the receiver item, and by sorting the mail list based on a time at which the mail data is transmitted or a date on which the mail data is received.

15. The mail service system of claim 12, wherein the at least one card item includes an attachment file item of mail data, and
the mail list configurer is configured to configure the separate mail list by selecting mail data among the retrieved mail data that is determined as a result of said searching to include a hash value of the file name in the attachment file item.

16. The mail service system of claim 12, wherein the search result provider is configured to, in response to selecting the mail card from the search result displayed on the display of the user terminal via the interactive link, provide the separate mail list to the user terminal through the interactive link included in the mail card.

17. The mail service system of claim 12, wherein the card item setter is configured to provide information about the plurality of items to the user terminal, and to set, as the at least one card item, at least one item selected by the user terminal from among the plurality of items.

* * * * *